United States Patent
Cuda et al.

[11] 3,808,486
[45] Apr. 30, 1974

[54] SELECTIVE FREQUENCY COMPENSATION FOR A SERVO SYSTEM

[75] Inventors: John Cuda, San Jose; Frank J. Sordello, Los Gatos, both of Calif.

[73] Assignee: Information Storage Systems, Inc., Cupertino, Calif.

[22] Filed: Aug. 25, 1972

[21] Appl. No.: 283,859

[52] U.S. Cl............... 318/620, 318/619, 318/621, 318/629
[51] Int. Cl. ............................................. G05b 5/01
[58] Field of Search .......... 318/615, 619, 621, 637, 318/629, 692, 620

[56] References Cited
UNITED STATES PATENTS

| | | | |
|---|---|---|---|
| 3,351,829 | 11/1967 | Quarnstrom | 318/615 X |
| 2,931,901 | 4/1960 | Markusen | 318/621 X |
| 3,398,341 | 8/1968 | Dooley et al. | 318/621 X |
| 3,639,825 | 2/1972 | MacMullan | 318/619 X |
| 2,629,077 | 2/1953 | Westfelt | 318/692 X |
| 3,184,662 | 5/1965 | Wallace | 318/621 |
| 3,246,220 | 4/1966 | Shinners | 318/621 X |

Primary Examiner—T. E. Lynch
Attorney, Agent, or Firm—Moore, Zimmerman & Dubb

[57] ABSTRACT

A servo system for positioning a moveable member including means for amplifying the servo response in a preselected frequency range.

6 Claims, 5 Drawing Figures

FIG. 1
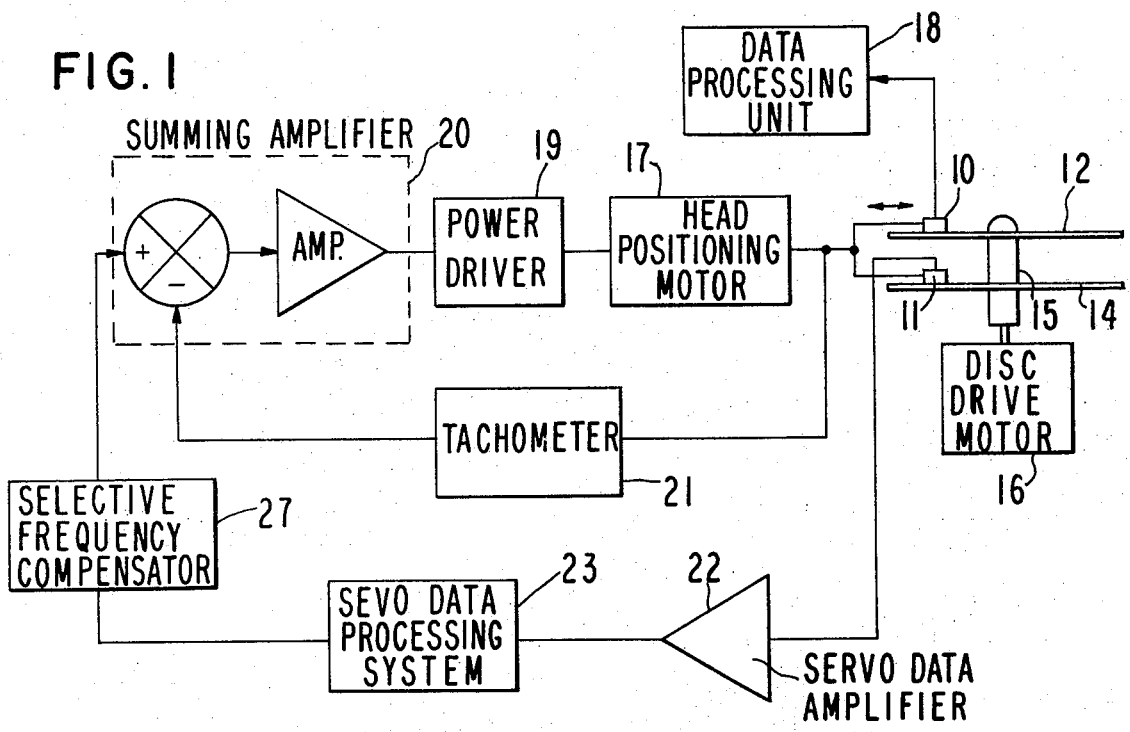
FIG. 2
FIG. 3
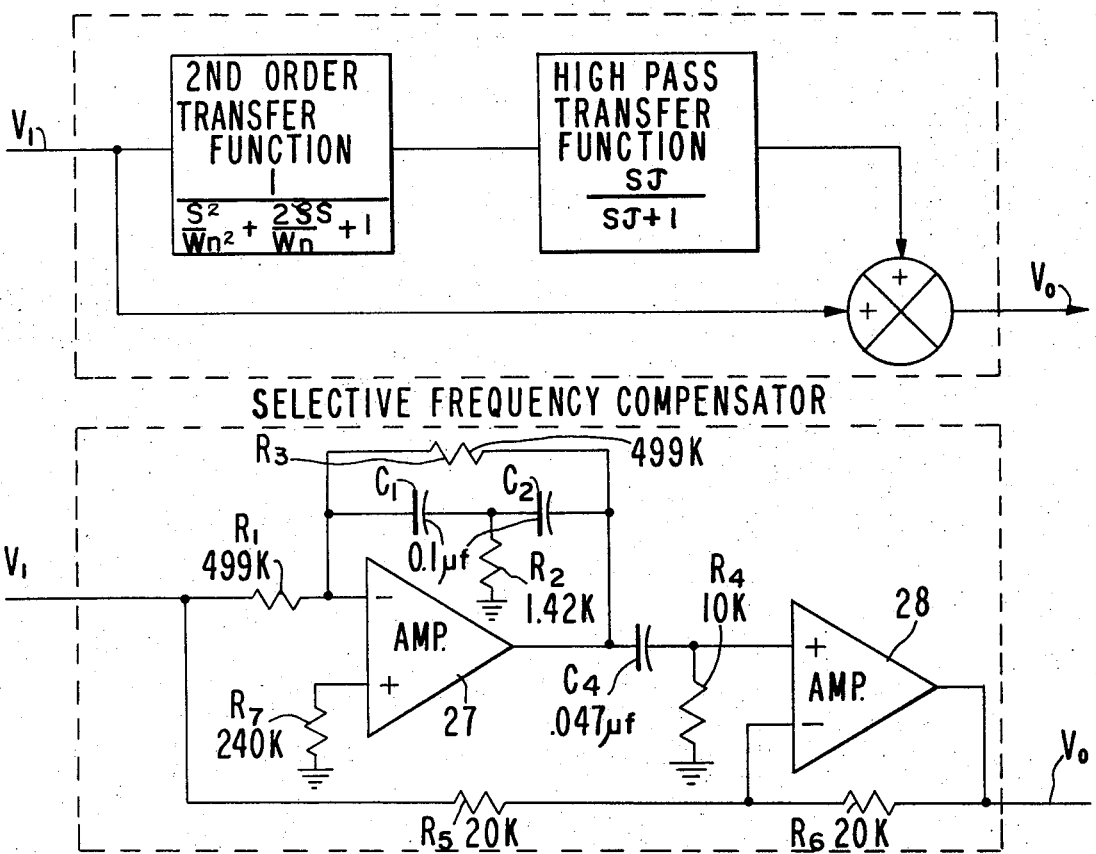

SELECTIVE FREQUENCY COMPENSATION FOR A SERVO SYSTEM

BACKGROUND OF THE INVENTION

This invention relates to servo systems of the type used to position moveable members.

In such servo systems it has frequently been desirable in the past to increase the gain of the system in specific frequency ranges. However, previously the principal manner of accomplishing increased gain in one range was to increase the gain of the overall system. The increasing of the overall gain of the servo system also must proportionally increase the servo system bandwidth with results which have frequently been undesirable or impossible to accommodate such as uncontrolled oscillations at the increased frequency ranges.

Additionally, in attempting to raise the gain, the probability of intollerable phase margins of the servo system is inherently increased. Naturally if such a phase margin is sufficiently small, an underdamped or unstable servo system will result. In either case any addition in the phase shift of the system is usually undesirable and adds to the instability of the system. It is therefore the object of the present invention to achieve a gain in the servo system at a selected frequency range and yet provide a stable, lower bandwidth system.

SUMMARY OF THE INVENTION

A servo system for controlling the positioning of a moveable member in which means are provided for generating a first signal responsive to the actual position of the moveable member and a second signal responsive to the desired position of the moveable member, with actuating means for moving the moveable member in response to an error signal derived from the first and second signals until the member reaches the desired position and including also means for amplifying within a selected frequency region the error signal without substantially affecting the phase margin of the servo system thereby increasing the responsiveness of the servo system in that frequency range.

DESCRIPTION OF THE DRAWINGS

FIG. 1 is a block diagram of a preferred embodiment of the invention;

FIG. 2 is a block diagram showing the functions of the selective frequency compensator of FIG. 1;

FIG. 3 is a schematic of the block diagram shown in FIG. 2;

DESCRIPTION OF PREFERRED EMBODIMENT

Figure 4:
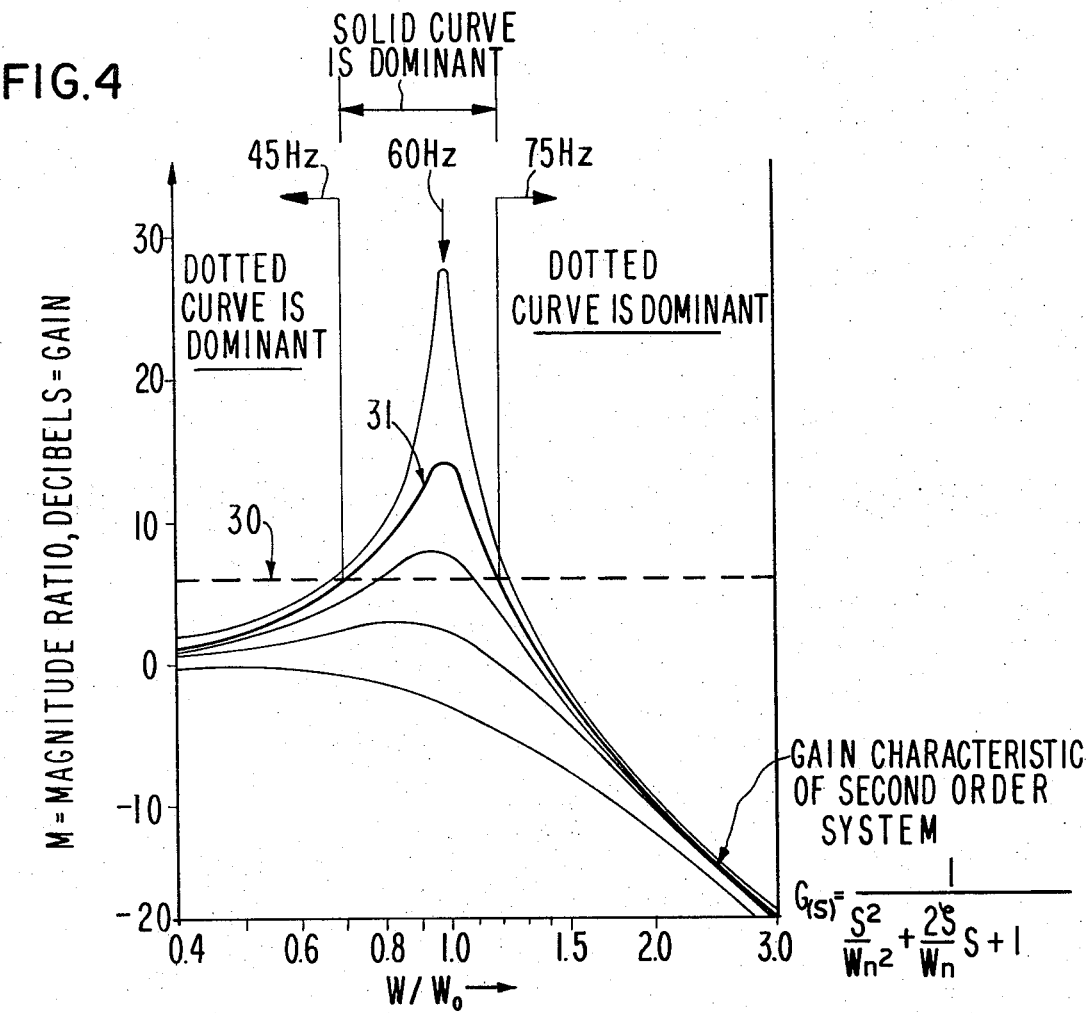
FIG. 4 is a family of curves depicting the gain characteristics of a second order system and the implementation into the subject invention.

In FIG. 1 is shown a servo system for positioning a moveable member which in this instance is a pair of recording heads 10 and 11 which are used in cooperation with a pair of rotating discs 12 and 14 mounted on a spindle 15 which is rotated by a disc drive motor 16. As the heads are moved laterally across the disc surfaces by the head positioning motor 17, data can be recorded on or read from the disc surface. Such systems are commonly called disc drive recorders and have been used many years in the computer field.

In the example shown, the head 10 is a read/write head which transfers data from a data processing unit 18 and the disc surface. The head is positioned at various tracks which comprise concentric circles on the rotating disc. The head positioning motor 17 is controlled by a power driver 19 which receives from a summing amplifier 20 a head drive signal indicating that the heads should be moved radially inward or outward to a desired track position. The speed of movement of the head is detected by a tachometer 21 which supplies a signal that is fed back to the summing amplifier and subtracted from the head drive signal to control the speed of the head positioning motor.

The position of the heads is detected in this instance by the read head 11 which detects prerecorded tracks (not shown) on the disc 14. The track signals are fed through a servo data amplifier 22 and a servo data processing system 23 to the summing amplifier 20. Thus, the summing amplifier receives signals from this circuit indicating the actual position of the head with respect to a desired head position (the center of the track). The position error signal described above is summed with a subtractive tachometer signal for the purpose of generating a head drive signal which when fed through the head positioning system will move the heads towards the desired position.

In present machines there occurs certain characteristics which tend to limit the tracking accuracy of the servo system. There naturally exists certain mechanical tolerances in the head positioning motor and support system. Adding to the mechanical tolerance problem is the fact that the recording disc in present day systems are removeable. That is, the Hub 15 with the attached disc surfaces can be removed from the disc drive motor mounting apparatus (spindle) to permit the insertion of other discs into the system. There naturally exists certain tolerances between the abutting surfaces of the disc packs and the disc drive spindle which results in what is referred to as disc pack run-out. Run-out is caused by eccentricity of the pack of spindle, or both, and since the disc pack rotates at a specific speed, the frequency of this run-out or movement between the disc and the head is predictable. For instance, where the disc pack is rotated at 3,600 RPM, the run-out frequency is 60 Hertz.

Therefore, it is desirable in this servo system to make the servo system stiff, that is, enhance the response of the system in the 60 Hertz range. Of course other servo systems may have a requirement for stiffness in other frequency ranges. Attempts to accomplish this desired purpose by raising the overall gain of the servo system have met with only limited success, since mechanical resonances within mechanical positioning systems makes the unlimited increasing of the servo gain impossible. Additionally, the increasing of the overall gain of the servo system proportionally increases the servo system bandwidth with the usual undesirable results heretofore discussed.

It is well known* (*See P. 210, *Article Analysis & Design of Feedback Control Systems*, George J. Thaler & Brown, McGraw-Hill, Second Edition.) in the science of servo system theory that a typical positioning servo will have a closed loop response that is a function of the open loop gain and phase characteristics near the frequency region where the gain approaches unity. A stable servo system can be made less stable or even to oscillate by alteration of the gain or the phase or both in the unity gain region. Hence, if one could enhance or alter the gain and/or phase in a desired frequency region without altering them in the unity loop gain frequency region, the servo system would have an enhanced response in the enhanced region without affecting the system stability. In the present invention there is accomplished a selective amplification of the gain in a desired frequency range the amplifying the feedback signal in the servo system while avoiding servo oscillation and maintaining stability in the system. This is accomplished by the selective frequency compensator circuit 27 shown in block diagram in FIG. 1 which serves to amplify the first signal or the actual position error signal of the moveable member in a selected frequency region. Such amplification is accomplished without rendering the servo system unstable by further compensating for the resulting phase shift as will be explained hereinafter.

Accordingly, in FIG. 2 is shown the selective frequency compensator which comprises a second order transfer function and a high pass transfer function as shown. The output signals of which are added to the original input signal. Thus a resonant circuit which in this instnace is tuned to 60 Hertz is provided. This resonant circuit is controlled in its characteristics, in that its phase shift characteristic does not cause any noticeable effect on a normal servo bandwidth since the overall gain of the servo system is not enhanced, but merely that gain centering around 60 Hertz in the example shown. In short, the selective frequency compensator has gain characteristics that are high at the 60 Hertz region and a gain of one at any other frequency region, and phase characteristics that are different than 0° only in that 60 Hertz region.

In FIG. 3 is shown the circuit diagram for the invention. As can be seen the second order transfer function and the high pass transfer functions are in the form of amplifiers having controlled feedback. Amplifier 27 is a common "op-amp" such as a model 747. The summing resistor, R1 and the feedback network formed by R3, C1, C2 and R2 cause that op-amp configuration to yield a second order transfer function. The second op-amp 28 acts as a summing junction for the output of the high-pass transfer function yielded by C4 and R4, and the original input signal V1. Such circuit for yielding these functions individually are well known in the art and are generally described in the present textbooks. However, the combination of these circuits in the described invention has not been done previously and is the present invention.

In FIG. 4 is shown graphically the effect of the frequency compensator. In operation at low frequencies the line 30 represents the gain of the system. However, when a frequency of approximately 45 Hertz is encountered, the second order transfer function, line 31, affects the gain sufficiently to raise the gain centering around the 60 Hertz frequency. Thereafter when the gain of that transfer function drops, at a frequency of approximately 75 Hertz, the circuit again operates with the gain represented by the line 30.

Figure 5:
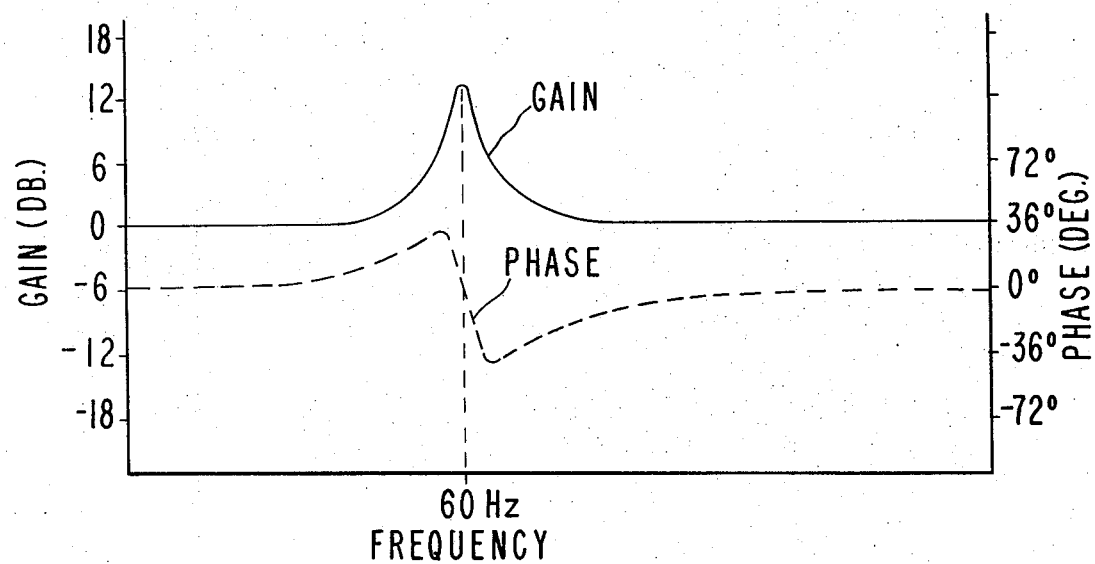
FIG. 5 is a curve showing the gain and phase characteristics vs. frequency drive from the subject invention.

The following is a mathematical derivation of the selective frequency compensator to show that the response is that shown in FIG. 5.

The gain of the circuit shown is:

$$-\frac{V_o}{V_i} = K_2 \left[ \frac{\tau_2\tau_3\tau_4 S^3 + \left(2\frac{A}{K_2}\tau_2\tau_4 + \tau_2\tau_3\right)S^2 + \left(\frac{A}{K_2}\tau_4 + 2\tau_2\right)S + 1}{(\tau_2\tau_3 S^2 + 2\tau_2 S + 1)(\tau_4 S + 1)} \right]$$

where $$\tau_2 = R_2 C$$
$$\tau_3 = R_3 C$$
$$\tau_4 = R_4 C_4$$
$$R_3/R_1 = K_1$$
$$A = K_2 + K_1(1 + K_2)$$
$$R_b/R_5 = K_2$$

For the values shown, equation (1) can be reduced to:

$$-\frac{V_o}{V_i} = \frac{\left[\frac{S}{2\pi 329}+1\right]\left[\frac{S^2}{(2\pi 60.8)^2}+\frac{2(0.023)}{2\pi 60.8}S+1\right]}{\left[\frac{S}{2\pi(338)}+1\right]\left[\frac{S^2}{(2\pi 59.8)^2}+\frac{2(0.053)}{2\pi 59.8}+1\right]}$$

The response is shown in FIG. 5.

We claim:

1. A servo system having a bandwidth of a predetermined frequency range for controlling the actuators of a movable member to selected ones of a plurality of desired positions, said servo system comprising:
   means for generating a first signal responsive to the actual positions of the movable member;
   means for generating a second signal responsive to a desired position for the movable member;
   means for combining the first and second signals to generate an error signal;
   means acting in response to said error signal for actuating the movable member thereby to move said movable member in a direction towards said desired position, and
   feedback circuit means for enhancing said error signal only in a preselected frequency region within the bandwidth frequency range without affecting the error signal in all other frequency regions of the bandwidth frequency range thereby increasing the loop gain in said preselected region thus causing a greater response from said movable member actuating means to an error signal in said enhanced frequency region.

2. A servo system as defined in claim 1 wherein the feedback circuit means adapted to enhance the error signal changes the gain and phase characteristics of the error signal only in the preselected frequency range.

3. A servo system as defined in claim 1 wherein the feedback circuit adapted to enhance the error signal includes means for generating a second order transfer function and a high pass transfer function for the error signal.

4. A servo system having a bandwidth of a predetermined frequency range for controlling the actuation of a movable member having a runout characteristic to selected ones of a plurality of desired positions, said servo system comprising:
   means for generating a first signal responsive to the actual position of the movable member;
   means for generating a second signal responsive to a desired position for the movable member;

means for combining the first and second signals to generate an error signal;

means acting in response to said error signal for actuating the movable member thereby to move said movable member in a direction towards said desired position; and feedback circuit means for amplifying said error signal only in a preselected frequency region corresponding to said runout characteristic included within the bandwidth frequency range thereby increasing the loop gain in said preselected region thus causing a greater response from said movable member actuating means to an error signal in said amplified frequency region so that an effect of said runout characteristic of said movable member is reduced.

5. A servo system as defined in claim 4 wherein said feedback circuit means adapted to enhance the error signal changes the gain and phase characteristics of the error signal only in the preselected frequency region.

6. A servo system as defined in claim 4 wherein said feedback circuit means adapted to enhance the error signal includes means for generating a second order transfer function and a high pass transfer function for the error signal.

* * * * *